Patented June 18, 1935

2,005,295

UNITED STATES PATENT OFFICE 2,005,295

PROCESS OF POLYMERIZING ORGANIC COMPOUNDS CONTAINING A DOUBLE LINKAGE, AND PRODUCTS OBTAINABLE THEREBY

Kurt Meisenburg, Leverkusen, near Cologne-on-the-Rhine, Germany, assignor to I. G. Farbenindustrie Aktiengesellschaft, Frankfort-on-the-Main, Germany, a corporation of Germany No Drawing. Application March 13, 1929, Serial No. 346,809. In Germany March 16, 1928

4 Claims. (Cl. 260—2)

The present invention relates to a process of polymerizing organic compounds containing only one double linkage and to the products obtainable thereby.

It is known, that a large number of organic compounds containing only one double linkage, especially such ones as correspond to the general formula

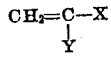

wherein X stands for hydrogen or an alkyl group, Y means an aromatic nucleus or an acyl radical, will polymerize to resin-like products, for instance, after prolonged standing for several weeks or even years.

Now I have found that the polymerization of the compounds above mentioned, such as, for instance, styrol, vinylnaphthalene, methyleneacetone, methylenemethylethylketone, methyleneacetophenone, will perform in a rather short time, when emulsifying the same in water in the presence of a suitable emulsifying agent, such as soaps, milk, alkali metal salts of alkylated naphthalene sulfonic acids, alkali metal salts of bile acids and the like. Polymerization is then performed by slightly heating the emulsions, preferably to about 30–60° C. with or without shaking or stirring. When working in this manner, polymerization will be complete in the most cases within several days.

Resin-like polymerization products are thus obtained exerting more valuable technical properties than those being obtainable according to the processes hitherto known.

The following examples illustrate my invention, without limiting it thereto, the parts being by weight:—

*Example 1.*—76 parts of styrol are shaken with 100 parts of milk at 60° C for about 10 days. A resin-like polymerization product is thus obtained, being elastic at 100° C.

*Example 2.*—55 parts of methylenemethylethylketone are shaken with an aqueous solution of sodium oleate of 10% strength at a temperature of 60° C. for about 8 days. A light yellow resin is thus obtained in a quantitative yield.

I claim:—

1. The process which comprises emulsifying a compound corresponding to the general formula

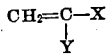

wherein X stands for hydrogen or alkyl, Y means an aromatic nucleus or an acyl radical, in water in the presence of an emulsifying agent, and causing polymerization to take place at a temperature between about 30–60° C.

2. The process which comprises emulsifying a compound of the group consisting of styrol and methylenemethylethylketone in water in the presence of an emulsifying agent, and causing polymerization to take place at a temperature between about 30–60° C.

3. Resin-like products being obtainable according to the process claimed in claim 1.

4. Resin-like products being obtainable according to the process claimed in claim 2.

KURT MEISENBURG. [L. S.]